June 26, 1934.  W. H. HACKETT  1,964,116
FITTING-UP BOLT
Filed June 2, 1933

INVENTOR.
William H. Hackett
BY Munn & Co.
ATTORNEYS.

Patented June 26, 1934

1,964,116

UNITED STATES PATENT OFFICE 1,964,116

FITTING-UP BOLT

William H. Hackett, Oakland, Calif.

Application June 2, 1933, Serial No. 674,095

5 Claims. (Cl. 85—8)

My invention relates to improvements in fitting-up bolts, and it consists of the combinations, constructions and arrangements hereinafter described and claimed.

An object of my invention is to provide a fitting-up bolt designed primarily to hold two plates together while rivets are being secured in place. It is essential that the device be quickly secured in place and then quickly disassembled after the plates have been riveted together. It is further essential that the two plates be firmly gripped together during the riveting operation in order that the rivets will not be loose.

The device is extremely simple in construction and is so designed as to be made by drop forging. A bolt is passed through aligned openings in the plates and this bolt is held in position by a wedge, a cam block and a keeper. Pawls are used for holding the wedge and cam block against movement after the wedge has been driven home. In this way the plates can be securely held together for riveting. After riveting the removal of the keeper frees all of the parts and this permits the bolt to be quickly removed.

Other objects and advantages will appear in the following specification, and the novel features of the device will be particularly pointed out in the appended claims.

My invention is illustrated in the accompanying drawing forming a part of this application, in which Figure 1 is a side elevation of the device shown operatively applied to two plates;

Figure 2:
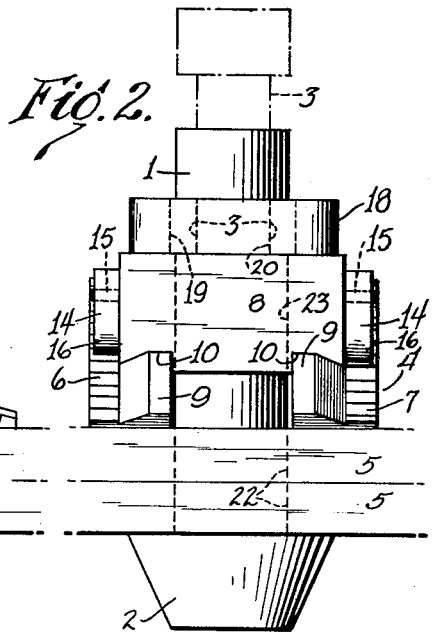
Figure 2 is a front view of the device.
Figure 4:
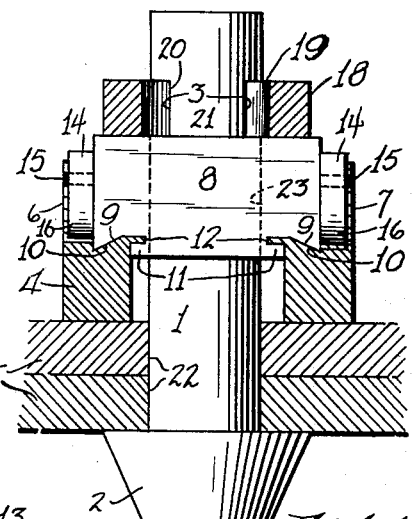
Figure 4 is a section along the line 4—4 of Figure 1.

In carrying out my invention I provide a bolt 1 having a head 2 and grooves 3, see Figure 4. If desired the bolt may be provided with two sets of grooves 3, as shown in Figure 2.

A wedge 4 in the shape of a U straddles the bolt. The plates or other members 5 which are to be riveted together are placed between the head 2 and the wedge 4.

Figure 3:
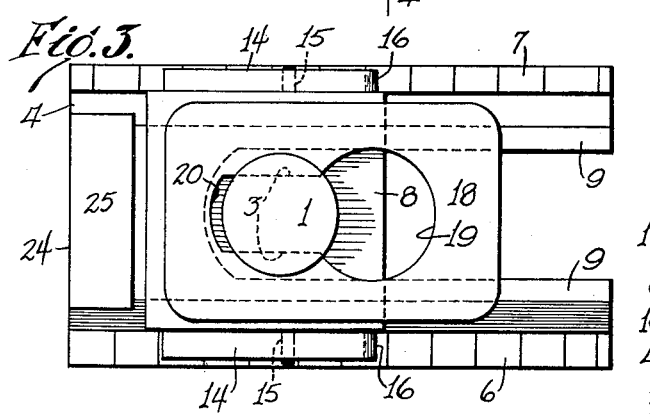
Figure 3 is a top plan view.
Figure 5:
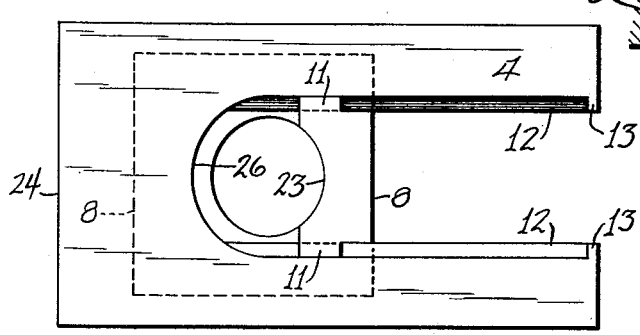
Figure 5 is a bottom plan view of the wedge and cam block.

Figure 3 clearly shows two inclined racks 6 and 7, and the teeth of the rack 6 alternate with the teeth of the rack 7, that is the teeth of the rack 6 are placed half-way between the teeth of the rack 7. A cam block 8 rides on the wedge 4 and is held against lateral movement by guides 9 formed in the legs of the U-shaped part of the wedge. The under surface of the cam block 8 is grooved at 10 for slidably receiving the guides 9. The block may be made by drop forging and it will be noted from Figure 4 that lugs 11 extend beneath the flanges 12 which form a part of the guides 9. In assembling the block 8 to the wedge 4, the lugs 11 extend at right angles to the face of the block. After the block is placed in position the lugs are bent over and assume the position shown in Figure 4. This prevents the removal of the block from the wedge, although the block can slide along the wedge. Stops 13, see Figure 5, are placed at the free ends of the flanges 12 and prevent the removal of the cam block. The stops 13 engage with the lugs 11 when the cam block is in one of its extreme positions.

Figure 1:
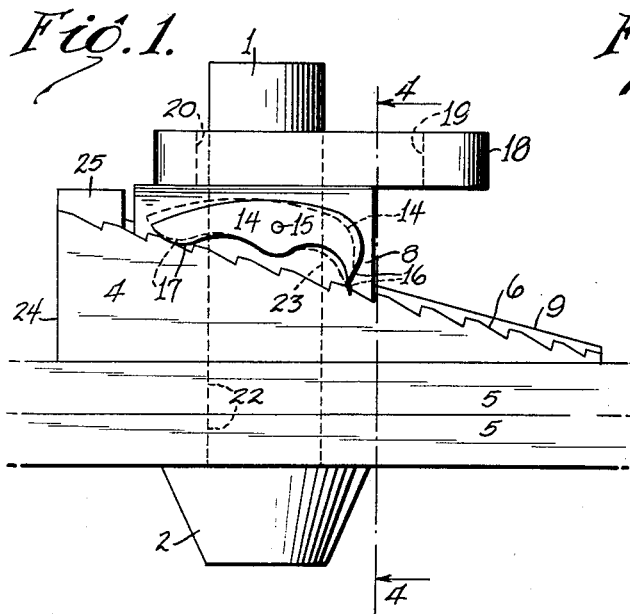

The cam block is held against movement toward the stops 13 by pawls 14. Two pawls are provided and they are mounted upon pins 15 which are integral with the block 8. The pawls are so shaped as to cause the ends 16 to be froced into a rack tooth when the opposite ends 17 ride up on another rack tooth. In this way the pawls are prevented from accidental disengagement. As already stated the teeth in the rack 6 are spaced between the teeth in the rack 7. This provides a finer adjustment because, although the cam block is in a position where one of the pawls will not engage with a rack tooth, the opposite pawl will engage with its rack tooth. In Figure 1 I show the pawl 14 in full lines as not engaging with the rack tooth, and I show by dotted lines that the pawl on the opposite side is engaging with the rack tooth.

A keeper 18 has an opening 19 for receiving the bolt 1 and has a slot 20 for receiving the reduced portion 21 of the bolt 1. When the parts are in operative position the keeper is moved so that it acts as a stop for the cam block 8.

From the foregoing description of the various parts of the device, the operation thereof may be readily understood.

The two members 5 to be riveted are placed together and the bolt 2 is placed through aligned openings 22 in the members. The wedge 4 is then placed in position and the bolt now extends through an opening 23 in the cam block 8. The keeper 18 is now secured in place, and then the wedge 4 is struck by a hammer or the like, the blow being delivered at the face 24 of the wedge. This will move the wedge to the right in Figure 1, and will cause the cam block 8 to travel up on the inclined guides 9. When the wedge has been driven home one of the pawls will be engaging with its associated rack tooth and will prevent return movement. In order to prevent the wedge from moving too far and bending the bolt, I provide a stop 25 on the edge which will contact with the cam block 8 before the wall 26 of the wedge, see Figure 5, will engage with the bolt 1. It is essential that the members 5 be securely clamped together for riveting, and it will be seen that the moving of the wedge 24 will cause the cam block 8 to be forced between the keeper and the wedge, and this in turn to cause the wedge to clamp the members 5 between itself and the bolt head 2.

Rivets are now disposed in place and secure the members 5 together. The device can be quickly removed by merely striking the keeper 18 and moving it to the left in Figure 1 so as to align the opening 19 with the bolt. This frees the keeper and with it the cam block and wedge. If desired two or more adjustments can be accomplished by merely providing more than one pair of grooves 3 in the bolt. I have shown two pairs of grooves 3 in Figure 2.

While I have shown only the preferred form of my invention, it should be understood that various changes or modifications may be made within the scope of the appended claims without departing from the spirit of the invention.

I claim:

1. A fitting-up bolt having notches therein, a wedge movable laterally with respect to the bolt and having two rows of teeth straddling the bolt, the teeth in one row being disposed midway between the teeth of the other row, a cam block slidable on the wedge and having an opening for receiving the bolt, pawls carried by the block and being designed to engage with the teeth, each pawl having one end designed to engage with the teeth and the other end enlarged for riding on the teeth, and for holding the pawl against accidental disengagement from the teeth, and a keeper removably receivable in the bolt notches and bearing against the block.

2. A fitting-up bolt having notches therein, a U-shaped wedge straddling the bolt and having two rows of teeth, a cam block removably mounted on the bolt and being slidably connected to the wedge, pawls pivotally carried by the block and being engageable with the teeth, each pawl having one end designed to engage with the teeth and the other end enlarged for riding on the teeth and for holding the pawl against accidental disengagement from the teeth, and a keeper removably received in the bolt notches and bearing against the cam block.

3. In combination, a bolt having notches, a U-shaped wedge straddling the bolt and having inwardly extending flanges, a cam block slidable on the wedge and having lugs slidably engaging with the flanges for preventing the removal of the block, stops carried by the wedge for limiting the movement of the block in one direction, locking means carried by the wedge and block for permitting movement of the block in only one direction when the device is being secured in place, and a keeper bearing against the block and being removably receivable in the notches.

4. In combination, a bolt, a wedge straddling the bolt, a cam block slidable on the bolt and wedge, and a keeper bearing against the block and being removably secured to the bolt, said wedge having a stop designed to abut the block prior to the wedge abutting the bolt.

5. In combination, a bolt, a wedge having two rows of teeth straddling the bolt, the teeth in one row being spaced midway between the teeth in the other row, a cam block slidable on the wedge and having an opening for receiving the bolt, projections carried by the block and flanges carried by the wedge for slidably securing the block to the wedge, stops carried by the wedge for limiting the movement of the block in one direction, pawls carried by the block and being engageable with the teeth, and a block engaging stop carried by the wedge and contactable with the cam block before the wedge contacts with the bolt, and a keeper removably secured to the bolt and bearing against the cam block.

WILLIAM H. HACKETT.